United States Patent
Nagai et al.

(10) Patent No.: US 7,212,576 B2
(45) Date of Patent: May 1, 2007

(54) PICTURE ENCODING METHOD AND APPARATUS AND PICTURE DECODING METHOD AND APPARATUS

(75) Inventors: Takeshi Nagai, Tokorozawa (JP); Takeshi Chujoh, Tokyo (JP); Shinichiro Koto, Yokohama (JP); Yoshihiro Kikuchi, Yokohama (JP); Wataru Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 592 days.

(21) Appl. No.: 10/661,697

(22) Filed: Sep. 15, 2003

(65) Prior Publication Data

US 2004/0080669 A1 Apr. 29, 2004

Related U.S. Application Data

(63) Continuation of application No. PCT/JP03/00426, filed on Jan. 20, 2003.

(30) Foreign Application Priority Data

| Jan. 18, 2002 | (JP) | ............................. 2002-010875 |
| Jan. 17, 2003 | (JP) | ............................. 2003-010135 |

(51) Int. Cl.
*H04N 7/12* (2006.01)
*H04B 1/66* (2006.01)

(52) U.S. Cl. ............................... 375/240.27; 375/240.1
(58) Field of Classification Search ...................... None
See application file for complete search history.

(56) References Cited

U.S. PATENT DOCUMENTS

| 5,715,005 | A | * | 2/1998 | Masaki ................... 375/240.16 |
| 6,005,623 | A | * | 12/1999 | Takahashi et al. ...... 375/240.16 |
| 6,111,596 | A | * | 8/2000 | Haskell et al. ................. 348/42 |
| 6,144,701 | A | * | 11/2000 | Chiang et al. ............... 375/240 |
| 2003/0202594 | A1 * | | 10/2003 | Lainema ................. 375/240.16 |
| 2004/0101049 | A1 * | | 5/2004 | Sugiyama .............. 375/240.12 |
| 2004/0114684 | A1 * | | 6/2004 | Karczewicz et al. ... 375/240.03 |

FOREIGN PATENT DOCUMENTS

| CA | 2 431 866 A1 | 7/2002 |
| EP | 0 798 929 A2 | 10/1997 |
| EP | 0 851 685 A2 | 7/1998 |
| EP | 1 081 963 A1 | 3/2001 |
| JP | 4-61582 | 2/1992 |
| JP | 4-170184 | 6/1992 |
| JP | 10-191356 | 7/1998 |
| WO | WO 02/054776 A1 | 7/2002 |

* cited by examiner

*Primary Examiner*—Nhon Diep
(74) *Attorney, Agent, or Firm*—Oblon, Spivak, McClelland, Maier & Neustadt, P.C.

(57) ABSTRACT

A picture encoding method includes receiving an input video signal, encoding the video signal using a reference picture signal to generate a video code stream, encoding the reference picture signal to generate a reference picture code stream, and multiplexing the video code stream with the reference picture code stream to generate an output code stream.

6 Claims, 11 Drawing Sheets

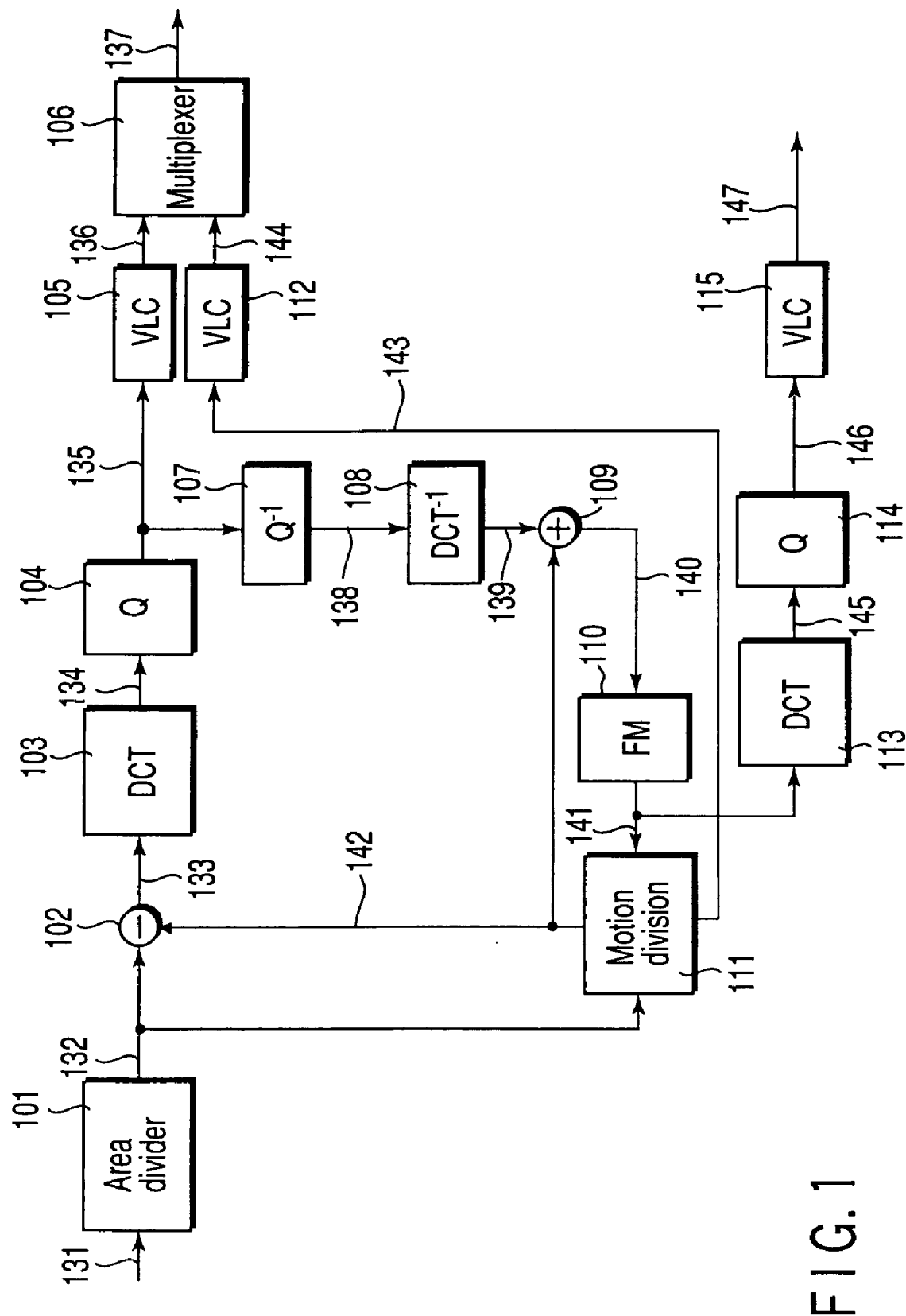
F I G. 1

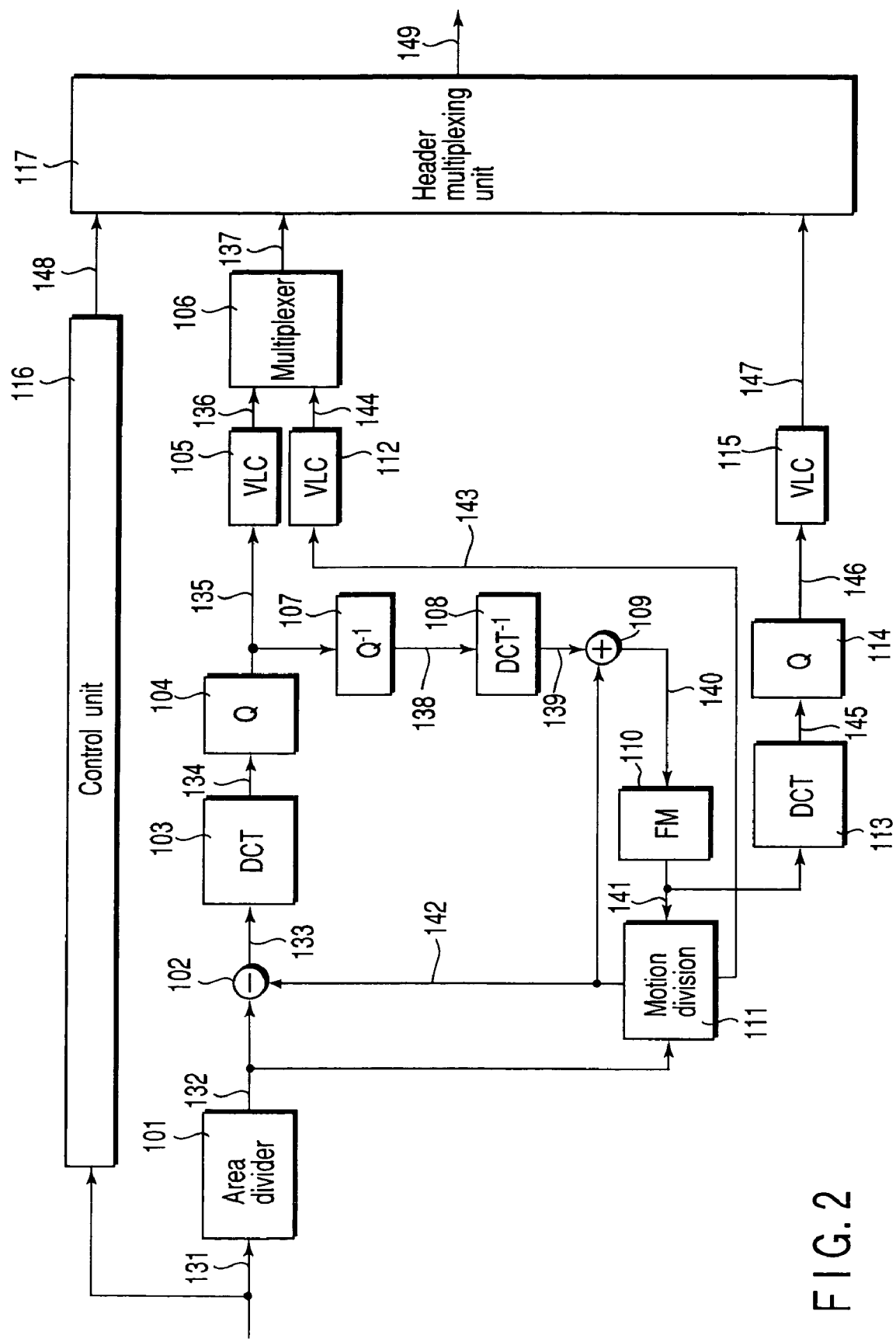
F I G. 2

FIG. 3A
FIG. 3B
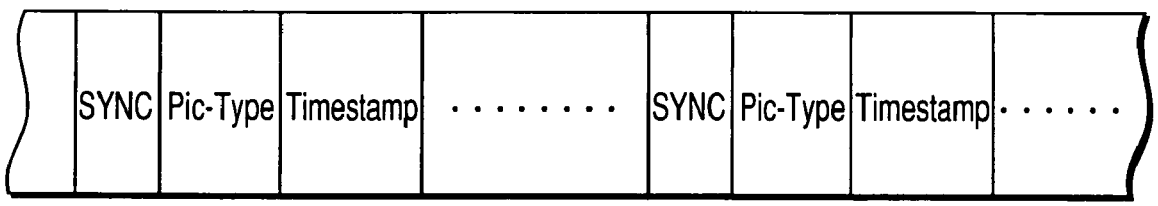
FIG. 4A
| Index | Pic-Type |
|---|---|
| 0 | I Picture (Intra) |
| 1 | P Picture (Intrer) |
| 2 | B Picture (Bi-directional) |
| 3 | R Picture (Reference) |
FIG. 4B

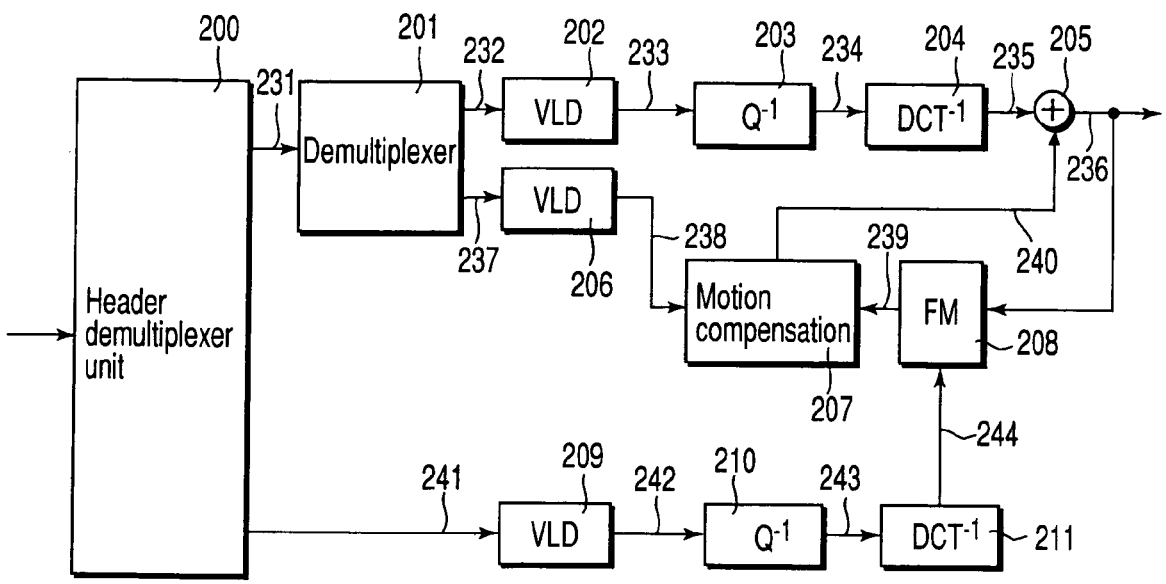
F I G. 5
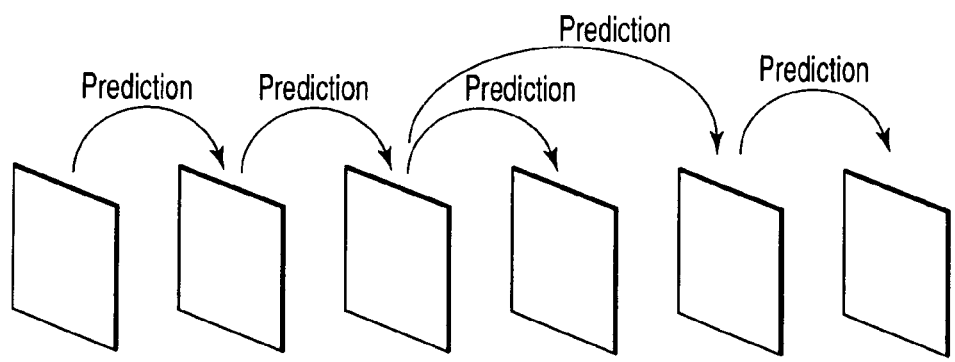
F I G. 6

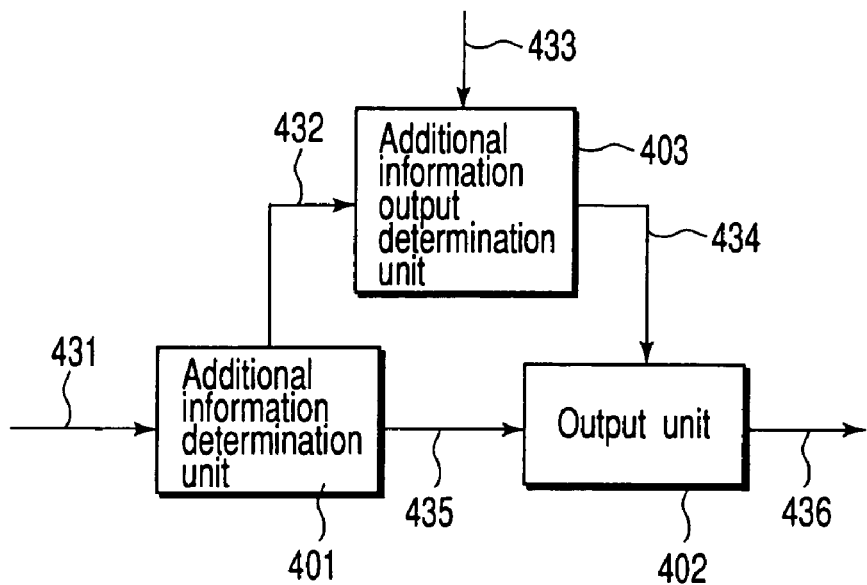
F I G. 9
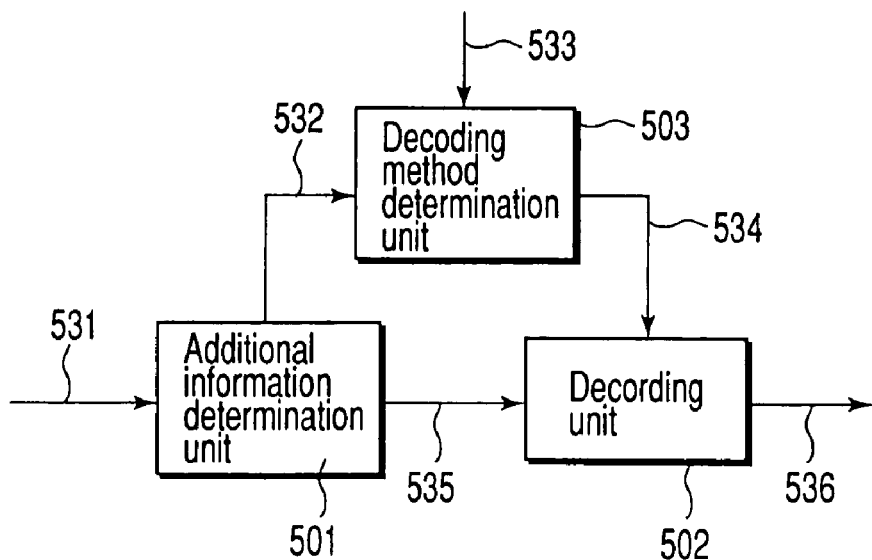
F I G. 10

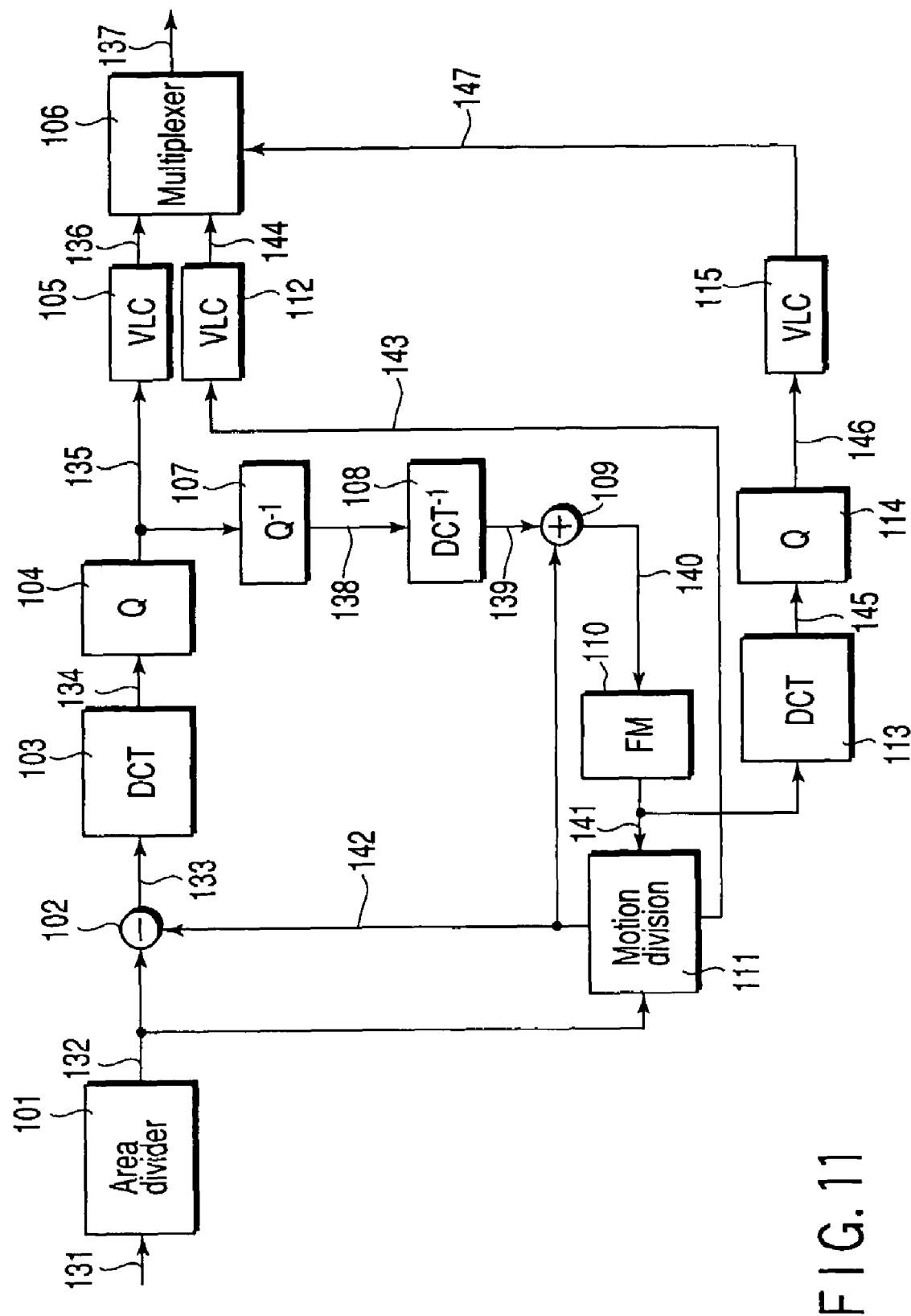
F I G. 11

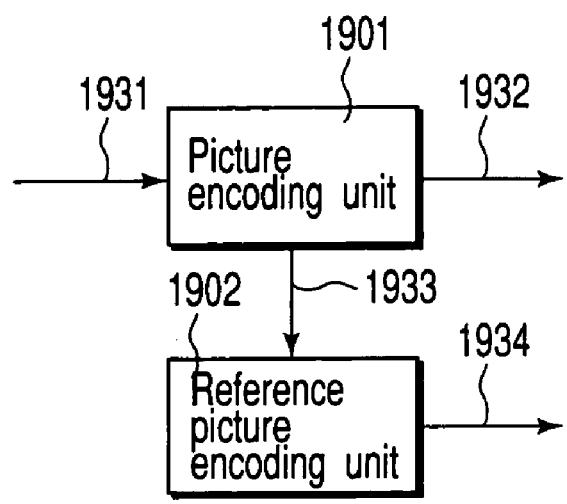
F I G. 16
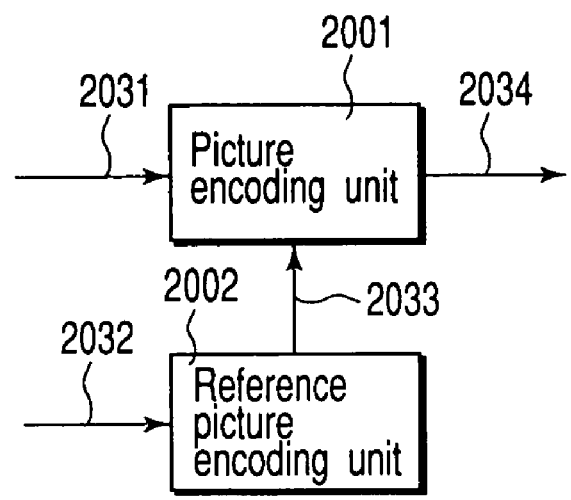
F I G. 17

PICTURE ENCODING METHOD AND APPARATUS AND PICTURE DECODING METHOD AND APPARATUS

CROSS-REFERENCE TO RELATED APPLICATIONS

This is a Continuation Application of PCT Application No. PCT/JP03/00426, filed Jan. 20, 2003, which was not published under PCT Article 21(2) in English.

This application is based upon and claims the benefit of priority from the prior Japanese Patent Applications No. 2002-010875, filed Jan. 18, 2002; and No. 2003-010135, filed Jan. 17, 2003, the entire contents of both of which are incorporated herein by reference.

BACKGROUND OF THE INVENTION

1. Field of the Invention

The present invention relates to a picture encoding method of compression-encoding a picture in a few number of bits and a picture decoding method of playing back a picture by decoding a code stream obtained by compression encoding and, more particularly, to a picture encoding method and apparatus and a picture decoding method and apparatus which can make a recovery from the adverse effect of an error as fast as possible without degrading the encoding efficiency when transmitting/storing encoded data through a transmission path susceptible to errors.

2. Description of the Related Art

It is necessary to compression-encode pictures in a few number of bits in order to transmit or store the pictures in systems designed to transmit or store pictures, e.g., a videophone, video conference system, portable information terminal, digital video disk system, and digital TV broadcasting system.

As such compression encoding techniques, various schemes have been developed, including a motion compensation scheme, discrete cosine transform scheme, subband encoding scheme, pyramid encoding scheme, and combinations thereof. The following are defined as international standards for video compression encoding: ISO•MPEG-1, MPEG-2, MPEG-4, ITU-T H.261, H.262, H.263, and the like.

All these schemes are compression encoding schemes based on a combination of motion compensation adaptive prediction and discrete cosine transform, which are described in detail in reference 1 (Hiroshi Yasuda, "MPEG/International Standardization of Multimedia Encoding", Maruzen) and the like.

A conventional picture encoding/decoding apparatus has the following problems. First, in a communication path with the possibility of being mixed with errors, such as a radio communication path, performing only encoding will lead to considerable deterioration in decoded picture quality upon occurrence of an error. When errors occur in signals such as a sync signal, mode information, and motion vector information, in particular, picture quality noticeably deteriorates.

Second, in motion compensation adaptive predictive encoding used for picture encoding, only the difference between frames is encoded. For this reason, if an error occurs, the corresponding frame fails, and an erroneous picture is stored in a frame memory. A predictive picture is generated by using the erroneous picture, and the residual error is added to the predictive error. As a consequence, even if subsequent frames are properly decoded, proper pictures cannot be obtained from the subsequent frames unless information is sent in an encoding mode (INTRA mode) of encoding pictures only within frames without using the differences between the frames or the influence of the error gradually wanes to restore the original pictures.

If 1-frame information is lost due to an error, the second frame is not decoded at all, and, for example, the first frame is directly output. At the third frame, a residual error which allows proper decoding only when it is added to the second frame is added to the first frame. As a consequence, the third frame is decoded into a picture totally different from the proper picture. Subsequently, residual errors are added to wrong pictures. Basically, therefore, the error does not disappear, and proper decoded pictures cannot be played back.

In order to solve this problem, in the prior art, a technique called "refresh" is generally used, in which encoding is performed in the INTRA mode in a predetermined cycle. When encoding is performed in the INTRA mode, since the number of coded bits increases, the quality of a picture without any error greatly deteriorates. For this reason, a periodic refresh method or the like is usually used, which refreshes several macroblocks per frame instead of refreshing an entire frame at once. In this periodic refresh method, however, although an increase in the number of coded bits can be suppressed, a long period of time is required to recover a normal state.

Other measures against errors include a measure of using error correction codes. Although this scheme can correct errors that occur randomly, it has difficulty in coping with errors of several hundred bits that consecutively occur in a burst manner. Even if the scheme can cope with such errors, considerable redundancy occurs.

Techniques have been studied to receive error information and the like about a network from a system and adaptively process the error information and the like on the server side. More specifically, such a technique uses a method of performing re-encoding upon reception of error information or switching a plurality of files. In this method, the server needs to have an encoding function and a function of adaptively switching a plurality of files, resulting in extra processing.

As described above, according to the conventional picture encoding techniques, loss of information due to an error causes a great deterioration in picture quality. In addition, a technique such as the periodic refresh method of reconstructing information lost due to an error requires a long period of time to achieve error recovery in consideration of the encoding efficiency. Shortening the time required for recovery will increase the number of encoded bits to result in a deterioration in encoding efficiency.

BRIEF SUMMARY OF THE INVENTION

It is an object of the present invention to provide a picture encoding method and apparatus and a picture decoding method and apparatus which can quickly recover from an error even if information is lost by the error, exhibit high encoding efficiency, and need not perform any re-encoding.

According to a first aspect of the present invention, there is provided a picture encoding method which comprises receiving an input video signal, encoding the video signal using a reference picture signal to generate a video code stream, encoding the reference picture signal to generate a reference picture code stream, and multiplexing the video code stream with the reference picture code stream to generate an output code stream.

According to a second aspect of the present invention, there is provided a picture encoding apparatus comprising a receiving unit configured to receive an input video signal, a first encoding unit configured to encode the video signal by using a reference picture signal to generate a video code stream, a second encoding unit configured to encode the reference picture signal to generate a reference picture code stream, and a multiplexing unit configured to multiplex the video code stream and the reference picture code stream to generate an output code stream.

According to the third aspect of the present invention, there is provided a picture decoding method which comprises receiving an input code stream containing a video code stream obtained by encoding a video signal and a reference picture code stream obtained by encoding a reference picture signal, decoding the reference picture code stream contained in the input code stream to generate a first reference picture signal, and decoding the video code stream contained in the input code stream by selectively using one of a second reference picture signal obtained from a previous picture signal and the first reference picture signal to generate a playback picture signal.

According to a fourth aspect of the present invention, there is provided a picture decoding apparatus which comprises an input unit configured to receive an input code stream containing a video code stream obtained by encoding a video signal and a reference picture code stream obtained by encoding a reference picture signal, a first decoding unit configured to decode the reference picture code stream contained in the input code stream to generate a first reference picture signal, and a second decoding unit configured to decode the video code stream contained in the input code stream by selectively using one of a second reference picture signal obtained from a previous picture signal and the first reference picture signal to generate a playback picture signal.

BRIEF DESCRIPTION OF THE SEVERAL VIEWS OF THE DRAWING

FIG. 1 is a block diagram showing the arrangement of a picture encoding apparatus according to a first embodiment of the present invention;

FIG. 2 is a block diagram showing the arrangement of a picture encoding apparatus to which a header multiplexing unit and control unit are added, according to the first embodiment;

FIGS. 3A and 3B are views for explaining an example of the data structure of a picture-associated portion of the output code stream output from the picture encoding apparatus according to the first embodiment;

FIGS. 4A and 4B are views showing an example of the structure of a frame header code stream of the output code stream output from the picture encoding apparatus according to the first embodiment;

FIG. 5 is a block diagram showing the arrangement of a picture decoding apparatus according to the first embodiment of the present invention;

FIG. 6 is a view showing a prediction structure for predictive encoding;

FIG. 9 is a block diagram showing the arrangement of an output determination unit for a reference picture code stream according to the first embodiment;

FIG. 10 is a block diagram showing the arrangement of a decoding operation determination unit for decoding a reference picture code stream according to the first embodiment;

FIG. 11 is a block diagram showing the arrangement of a picture encoding apparatus according to a second embodiment of the present invention;

FIG. 16 is a block diagram showing the arrangement of a picture encoding apparatus according to a fourth embodiment of the present invention; and FIG. 17 is a block diagram showing the arrangement of a picture decoding apparatus according to the fourth embodiment of the present invention.

Figure 7:
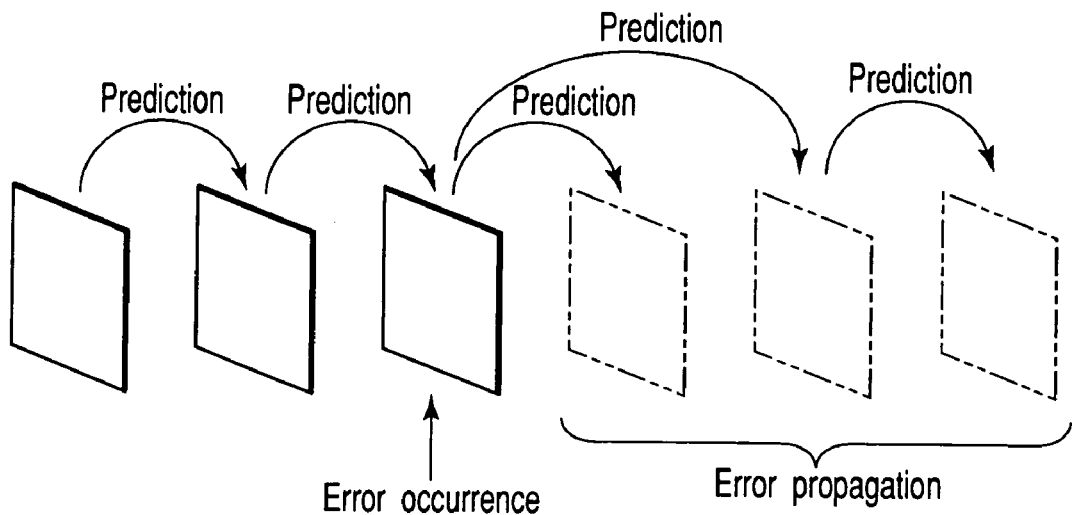
FIG. 7 is a view showing error propagation due to predictive encoding.

DETAILED DESCRIPTION OF THE INVENTION (First Embodiment)

FIG. 1 shows the basic arrangement of a picture encoding apparatus according to the first embodiment of the present invention.

An input video signal 131 is divided into a plurality of predetermined areas first by an area divider 101 and then subjected to the following motion compensation adaptive prediction. A motion compensation adaptive predictor 111 detects a motion vector 143 between an input picture signal 132 and a reference picture signal 141 of the previous frame which is stored in a frame memory 110 and has already been encoded and subjected to a local decoding. Motion compensation is performed for the reference picture signal 141 by using this motion vector. This generates a predictive picture signal (the reference picture signal after motion compensation) 142. The motion compensation adaptive predictor 111 selects a suitable prediction mode of the motion compensation prediction mode and the intra encoding (predictive picture signal=0) mode using the input picture signal 132 for encoding without any change, and outputs the predictive picture signal 142 corresponding to the selected prediction mode.

A subtracter 102 subtracts the predictive picture signal 142 from the input picture signal 132 and outputs a predictive residual error signal 133. The predictive residual error signal 133 is subjected to discrete cosine transform (DCT) for each block having a given size in a first discrete cosine transformer 103. DCT coefficients 134 obtained by the discrete cosine transform are quantized by a second quantizer 104. A first variable length encoder 105 encodes quantized DCT coefficients 135 to obtain a DCT coefficient code stream 136. A multiplexer 106 multiplexes the DCT coefficient code stream 136 with a motion vector code stream 144 obtained by encoding motion vector information using a second variable length encoder 112. The resultant data is output as a video code stream 137.

On the other hand, the DCT coefficient 135 is dequantized by a dequantizer 107 and then subjected to an inverse discrete cosine transform (inverse DCT). An adder 109 adds an output 139 from an inverse cosine transformer 108 to the predictive picture signal 142 to generate a local decoded picture signal 140. The local decoded picture signal 140 is stored as a reference picture signal in the frame memory 110.

The reference picture signal 141 of the previous frame output from the frame memory 110 is encoded by a reference picture encoding unit comprising blocks denoted by reference numerals 113 to 115. More specifically, the reference picture signal 141 is input to both the motion compensation adaptive predictor 111 and the second discrete cosine transformer 113. In the second discrete cosine transformer 113, the reference picture signal 141 is subjected to a discrete cosine transform (DCT) for each block having a predetermined size. The second quantizer 114 quantizes transform coefficients 145 obtained by this operation. The third variable length encoder 115 encodes the quantized transform coefficients. A code stream (to be referred to as a reference picture code stream hereinafter) 147 obtained by the third variable length encoder 115 is output as a frame different from the video code stream 137.

FIG. 2 shows an arrangement equivalent to that shown in FIG. 1 which additionally includes a header multiplexing unit 117 for adding frame headers. A control unit 116 manages the overall operation of the picture encoding apparatus. In this case, in particular, the control unit 116 selects, for example, either the encoding mode of outputting only the video code stream 137 or the encoding mode of outputting both the video code stream 137 and the reference picture code stream 147. The control unit 116 also generates a frame header code stream 148. The header multiplexing unit 117 generates an output code stream 149 by multiplexing the video code stream 137, reference picture code stream 147, and frame header code stream 148. The output code stream 149 is sent out to a transmission system or storage system (not shown).

FIGS. 3A and 3B show the data structure of a picture-associated portion of the output code stream 149 output from the picture encoding apparatus in FIG. 2. In the conventional picture encoding apparatus, a reference picture signal is not encoded, and only an input video signal is encoded. For this reason, a picture-associated portion of the output code stream 149 has a data structure formed from only the video code stream 137 ( . . . Frame #n, Frame #n+1, Frame #n+2, . . . ) of each frame like that shown in FIG. 3A. In contrast to this, in the picture encoding apparatus shown in FIG. 2, as shown in FIG. 3B, the reference picture code stream 147 (Ref-Frame #n+1) in an arbitrary frame, e.g., the (n+1)-th frame, is inserted before the (n+1)-th frame (Frame #n+1) in the video code stream 137. As a consequence, the frames are multiplexed to generate the output code stream 149.

In contrast to the case shown in FIG. 3B, a reference picture (147) may be inserted after the (n+1)-th frame (137).

FIGS. 4A and 4B show examples of the structure of the frame header code stream 148 contained in the output code stream 149. As the mode information of the code stream, Pic-type (picture type) information is defined. As a picture type, R-Picture is separately defined, which is the frame type of the reference picture code stream 147 unique to this embodiment, in addition to general I-Picture, P-Picture, and B-Picture. Another method may be used to recognize the reference picture code stream 147. The same effects as described above can be obtained by this method.

With regard to a Timestamp indicating the display time of a frame or the like, it is preferable to describe in an R-picture the Timestamp of a frame using this, i.e., the Timestamp of the next frame. Assume that the reference picture code stream 147 is omitted due to an error or a frame using the reference picture code stream 147 is omitted due to an error. In this case, such a Timestamp is effective information to identify the association between the frame and the reference picture code stream 147. In addition, using the same code stream structure as that of a general frame eliminates the necessity of a special additional circuit, a general circuit can be used.

The use of the scheme of discriminating the modes in accordance with mode information in this manner can implement a recovery function by not only encoding a reference picture signal used in this embodiment but also intra-encoding, for example, the target frame itself, which is to be recovered from an error, and implementing redundancy. A recovery function can be implemented by encoding in advance, in the intra mode, a frame to be subjected to motion compensation adaptive predictive encoding, and designating only mode information in an R-Picture or the like. In this case, when it is determined on the transmission side to transmit an R-Picture, there is no need to send the code stream of a corresponding general frame (mainly a P-Picture or B-Picture). This embodiment is therefore useful for the effective use of a transmission path.

The basic arrangement of a picture decoding apparatus corresponding to the picture encoding apparatus according to this embodiment will be described with reference to FIG. 5. The output code stream 149 output from the picture encoding apparatus shown in FIG. 2 is input as an input code stream to the picture decoding apparatus in FIG. 5 through the transmission system or storage system. In the picture decoding apparatus, a header demultiplexing unit 200 demultiplexes the input code stream into a video code stream 231 and a reference picture code stream 241. A demultiplexer 201 demultiplexes the video code stream 231 into a DCT coefficient code stream 232 and a motion vector code stream 237. The DCT coefficient code stream 232 is decoded through a variable length decoder 202, dequantizer 203, and inverse discrete cosine transformer 204 and reconstructed into a predictive error signal 235. The motion vector code stream 237 is decoded by a variable length decoder 206. Motion vector information 238 reconstructed by this operation is input to a motion compensation predictor 207.

The reference picture code stream 241 demultiplexed from the input code stream by a header demultiplexing unit (not shown) is transformed into a reference picture signal 244 through a variable length encoder 209, dequantizer 210, and inverse discrete cosine transformer 211. This code stream is then stored in a frame memory 208. Using the motion vector information 238, the motion compensation predictor 207 performs motion compensation for a reference picture signal 239 of the previous frame read out from the frame memory 208 to generate a predictive picture signal (a reference picture signal after motion compensation) 240. An adder 205 adds the predictive error signal 235 and the predictive picture signal 240 to generate a playback picture signal 236. The playback picture signal 236 is output to the outside of the apparatus and stored as a reference picture signal in the frame memory 208.

In this embodiment, the picture encoding apparatus sends out the information of a reference picture as a reference picture code stream to the transmission system or storage system independently of a video code stream. The picture decoding apparatus then decodes the reference picture code stream to reconstruct the information of the reference picture. This makes it possible to properly cope with the occurrence of an error. As described above, according to this embodiment, the picture recovery ability upon occurrence of an error can be improved.

This effect will be further described below. Consider, for example, video encoding operation using a prediction like that shown in FIG. 6. In this case, when an error occurs on the way as shown in FIG. 7, the error propagates to the subsequent frames using the prediction. For this reason, such encoding operation generally uses a periodic refresh method of periodically inserting a frame which can recover from an error, if it occurs, i.e., an intra-encoded frame (I-Picture). This however degrades the encoding efficiency.

Figure 8:
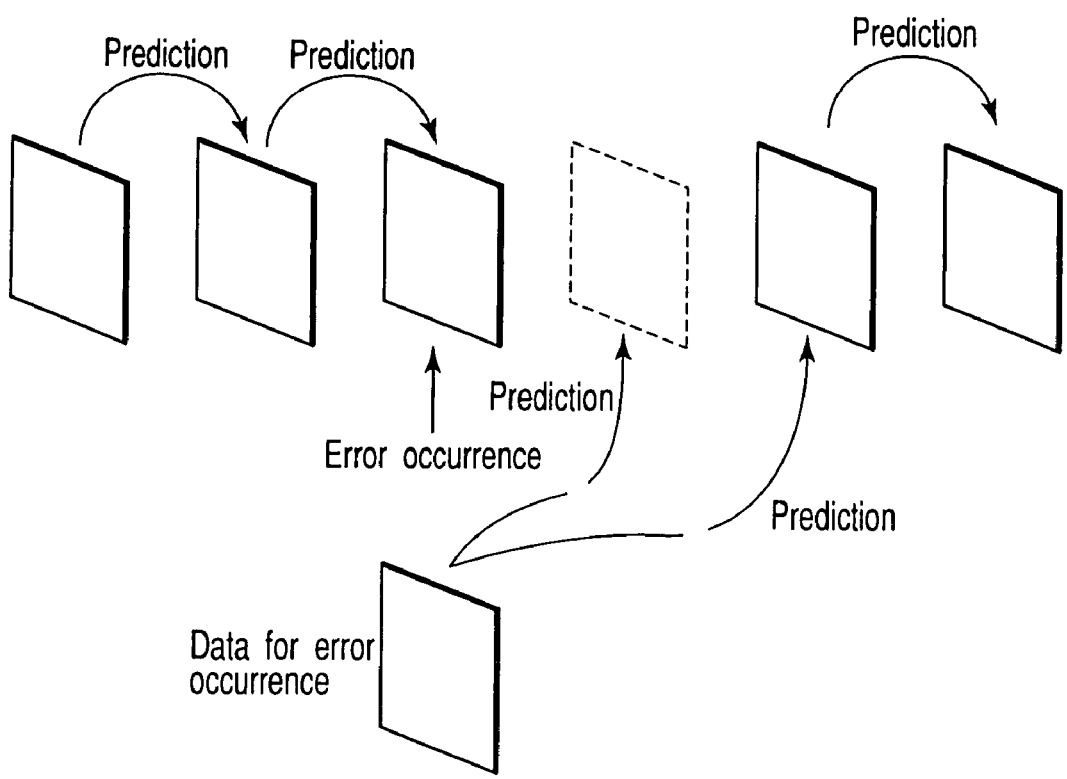
FIG. 8 is a view for explaining a method of coping with an error according to the first embodiment.

In contrast to this, according to this embodiment, in the picture decoding apparatus shown in FIG. 5, the reference picture signal obtained by decoding a reference picture code stream is separately held as the data of a reference picture signal used upon occurrence of an error in the frame memory 208, as shown in FIG. 8. This data is used to decode a video code stream only when an error occurs. That is, when no error occurs, a reference picture signal based on predictive encoding with high encoding efficiency is used. Only when an error occurs, a reference picture signal reconstructed by decoding a reference picture code stream is used to recover from the error. This apparatus may also be configured to forcibly replace the contents of the frame memory 208 with a reference picture decoded from a reference picture code stream upon occurrence of an error.

In the arrangement of this embodiment, the total number of codes generated in the picture encoding apparatus increases by the extent to which a reference picture signal is separately encoded. This problem can be solved by outputting a reference picture code stream only when needed. For example, mode information indicating a reference picture code stream is written at the head of a frame as frame type information indicating the type of the frame. This mode information is analyzed on the picture encoding apparatus side to determine whether or not to output a reference picture code stream. In the normal mode, no reference picture code stream is output.

FIG. 9 shows the basic arrangement of an output determination unit for such a reference picture code stream. This output determination unit is incorporated in, for example, the header multiplexing unit 117 in FIG. 2. Referring to FIG. 9, an input code stream 431 is input to an additional information determination unit 401, which determines whether this code stream is information indicating a normal frame or auxiliarily added information. In this embodiment, the input code stream 431 is a code stream including the video code stream 137 and reference picture code stream 147. The additional information determination unit 401 determines whether or not this code stream is the reference picture code stream 147 as additional information.

A determination result 432 from the additional information determination unit 401 is input to an additional information output determination unit 403. This unit determines in accordance with state information 433 indicating the current state whether or not to output the reference picture code stream 147. Assume that the state information 433 is information indicating whether or not an error is currently occurring. In this case, if an error is occurring, the additional information output determination unit 403 determines to output the reference picture code stream 147. In the normal state in which no error is occurring, the reference picture code stream 147 determines not to output the reference picture code stream 147.

A determination result 434 from the additional information output determination unit 403 is transferred to an output unit 402. The output unit 402 outputs the reference code stream 147, contained in a code stream 435 input through the additional information determination unit 401, as an output code stream 436 in accordance with the determination result 434 from the additional information output determination unit 403. This makes it possible to adaptively output the reference code stream 147, and hence prevents unnecessary information from being output in the normal state without any error.

In the picture decoding apparatus shown in FIG. 5, the reference picture code stream 241 may be input as an input code stream even in the normal state. For example, such cases include a case wherein a local file is played back and a case wherein no adaptive transmission is supported on the transmission side. In such a case, it can be determined on the picture decoding apparatus side whether or not to decode the reference picture code stream 241.

FIG. 10 shows the basic arrangement of a decoding operation determination unit which decodes a reference picture code stream upon determining whether or not to decode it. This decoding operation determination unit is incorporated in the header demultiplexing unit 200 provided on the front stage in FIG. 5. Referring to FIG. 10, an input code stream 531 is input to an additional information determination unit 501, which determines whether or not the code stream is additional information. In this embodiment, the input code stream 531 is a code stream containing the video code stream 231 and reference picture code stream 241. The additional information determination unit 501 determines whether or not the input code stream 531 is the reference picture code stream 241. This determination is performed by using, for example, mode information which is written in frame type information and indicates a reference picture code stream.

A determination result 532 from the additional information determination unit 501 is input to a decoding method determination unit 503 to be used to determine whether or not to decode the reference picture code stream 241. Information indicating whether the current decoding operation is local decoding or an error has occurred is supplied as state information 533 to the decoding method determination unit 503. The decoding method determination unit 503 determines from the determination result 532 from the additional information determination unit 501 and the state information 533 whether or not to decode the reference picture code stream 241 contained in a code stream 535 input through the additional information determination unit 501. A decoding unit 502 performs decoding in accordance with a determination result 534 from the decoding method determination unit 503 and outputs a playback signal 536. With this operation, in the case of local decoding or the like, the picture decoding apparatus can be controlled not to decode additional information. In the normal state without any transmission error, for example, the reference picture code stream 241 is discarded by the decoding method determination unit 503 without being decoded. Assume that a frame to be referred to is omitted and a playback picture cannot be normally decoded because an error has occurred in the transmission path. In this case, since a reference picture required to decode the playback picture is not stored in the frame memory, the reference picture code stream 241 is decoded to replace the picture stored in the frame memory. This prevents a deterioration in the playback picture due to mixing of the error. This apparatus can also use a technique of decoding a reference code stream and replacing the reference frame with the resultant data only when an error has occurred. The reception side can also be configured to decode an entire reference code stream upon receiving it regardless of whether or not the reference frame is to be replaced.

This embodiment has been described on the premise that one reference frame is used. However, a plurality of reference frames may be used. In this case, if all the pictures of a plurality of frames are added, the number of coded bits may become excessively large, resulting in lack of practicality. For this reason, only a small area (e.g., a macroblock in this case) of a plurality of reference frames which is to be referred to in motion compensation is selected and output as the reference picture code stream 241. In this case, a data structure per macroblock replaces the data structure per frame in FIG. 3B. Using this scheme makes it possible to avoid an increase in the number of coded bits due to encoding of macroblocks that are not used and to save the number of coded bits. In this case, a code stream is written together with information indicating that macroblock information output as additional information is a macroblock at a specific position in a specific frame.

(Second Embodiment)

FIG. 11 shows the arrangement of a picture encoding apparatus according to the second embodiment of the present invention. In the first embodiment, a reference picture code stream is output as a frame different from a video code stream. In the second embodiment, a reference picture code stream is output as additional information for the frames of a video code stream. The same reference numerals as in FIG. 1 denote the same parts in FIG. 11, and only the differences from the picture encoding apparatus according to the first embodiment will be described. In this embodiment, a reference picture code stream 147 is input to a multiplexer 106 to be multiplexed with a quantized and variable-length-encoded DCT coefficient 136 and motion vector code stream 144. The resultant data is then output.

Figure 12:
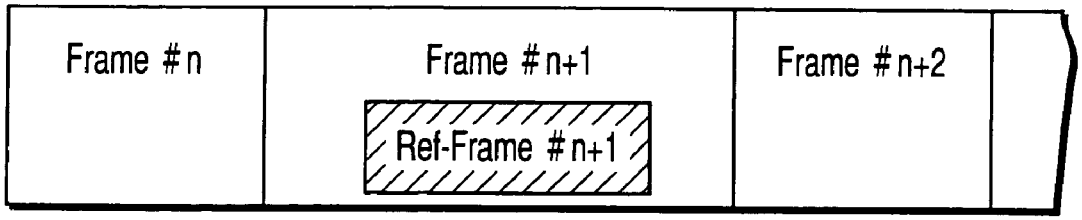
FIG. 12 is a view showing the data structure of a picture-associated portion of the output code stream output from the picture encoding apparatus according to the second embodiment.

With this arrangement, a reference picture signal required to encode and decode a specific frame of a video code stream is added to the frame. More specifically, as shown in FIG. 12, the reference picture code stream 147 (Ref-Frame #n+1) of the (n+1)-th frame becomes additional information in the same (n+1)-th frame (Frame #n+1) in a video code stream 137.

In the scheme of adding a reference picture code stream to a specific frame on a small area (macroblock) basis as described in the latter part of the first embodiment, the apparatus can use a scheme of multiplexing the video code stream 137 and the reference picture code stream 147 on a macroblock basis and adding, to the video code stream 137, determination flag information indicating whether or not the reference picture code stream 147 is added to a specific macroblock.

Figure 13:
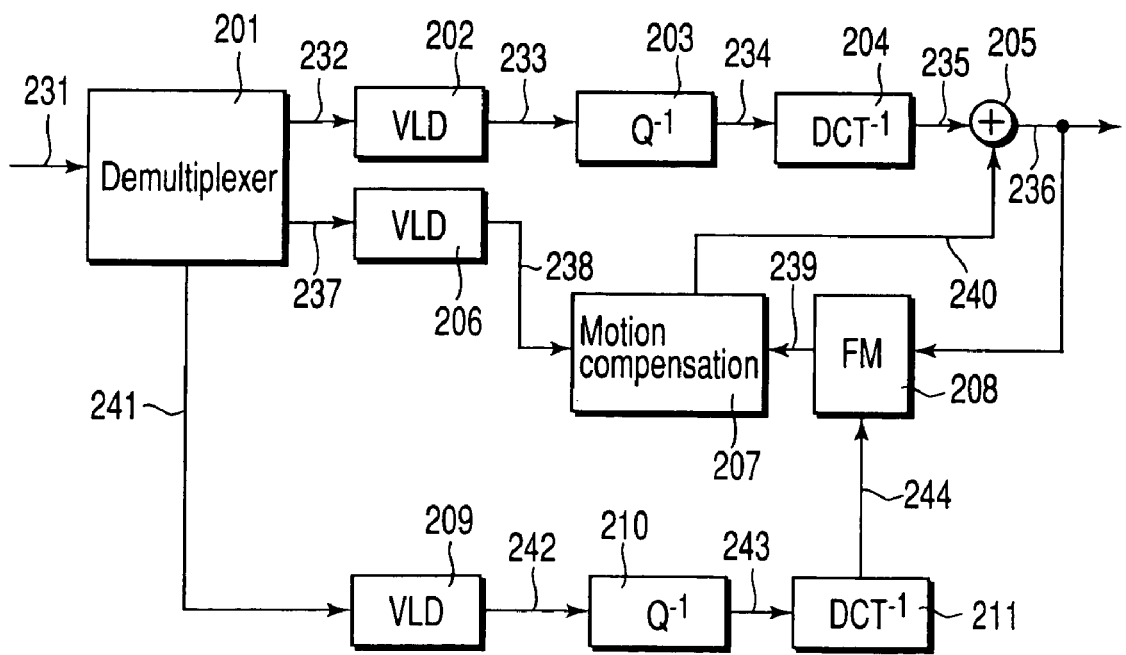
FIG. 13 is a block diagram showing the arrangement of a picture decoding apparatus according to the second embodiment of the present invention.

FIG. 13 shows the arrangement of a picture decoding apparatus corresponding to the picture encoding apparatus in FIG. 11. The same reference numerals as in FIG. 5 denote the same parts in FIG. 13, and only the differences from the picture decoding apparatus according to the first embodiment will be described below. In this embodiment, a demultiplexer 201 demultiplexes a reference picture code stream 241, which is inserted as additional information for a frame of a video code stream 231, from the video code stream 231, independently of a DCT coefficient code stream 231 and motion vector code stream 237. The demultiplexed reference picture code stream 241 is decoded through a variable length decoder 209, dequantizer 210, and inverse discrete cosine transformer 211 as in the first embodiment, thereby reconstructing a reference picture signal 244. The reference picture signal obtained by decoding the reference picture code stream is held as the data of a reference picture signal used upon occurrence of an error in a frame memory 208. When an error occurs, this reference picture data is used to decode the video code stream. This apparatus may also use the scheme of forcibly replacing the contents of the frame memory 208 with the reference picture decoded from a reference picture code stream when an error occurs.

(Third Embodiment)

Figure 14:
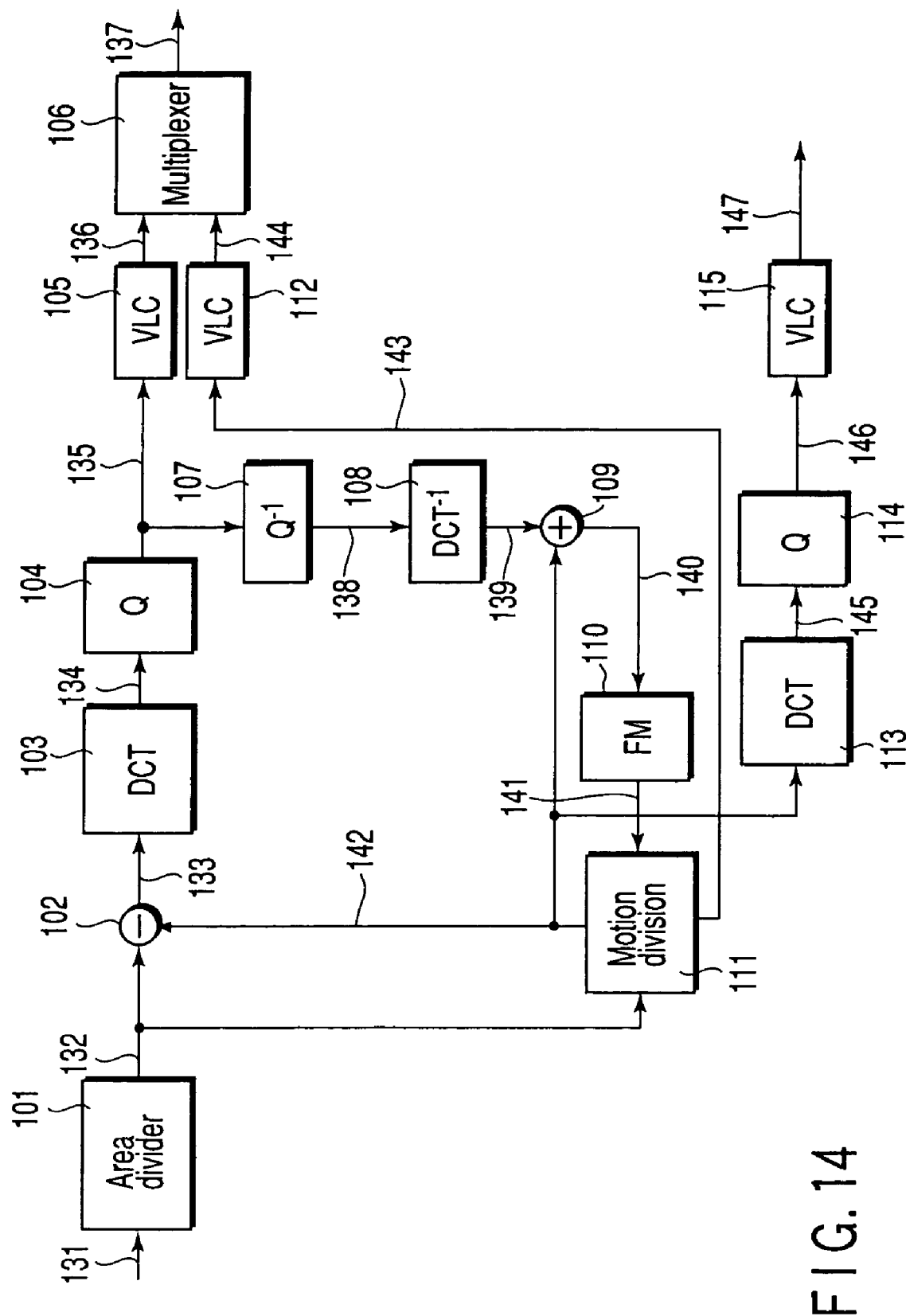
FIG. 14 is a block diagram showing the arrangement of a picture encoding apparatus according to a third embodiment of the present invention.

FIG. 14 shows the arrangement of a picture encoding apparatus according to the third embodiment of the present invention. In the first and second embodiments, the reference picture code stream 147 is generated by encoding the reference picture signal stored in the frame memory 110. In the third embodiment, a reference picture code stream 147 is generated by encoding a reference picture signal (predictive picture signal) after motion compensation. In this motion compensation, a reference picture obtained by selecting optimal portions from the reference picture signal stored in a frame memory 110 on a small area basis (mainly on a macroblock basis) is generally stored in the frame memory. For this reason, a reference picture signal 142 after motion compensation is a signal selected from a reference picture signal 141 stored in the frame memory 110 on a macroblock basis.

Referring to FIG. 14, the reference picture signal 142, which has undergone motion compensation (selected on a macroblock basis), output from a motion compensation adaptive predictor 111 is encoded through a discrete cosine transformer 113, dequantizer 114, and variable length encoder 115. As a consequence, the reference picture code stream 147 is generated. The reference picture code stream 147 generated in this manner is output in a frame different from that of a video code stream 137 as in the first embodiment, or output after inserted as additional information in the frame of the video code stream 137 as in the second embodiment.

Figure 15:
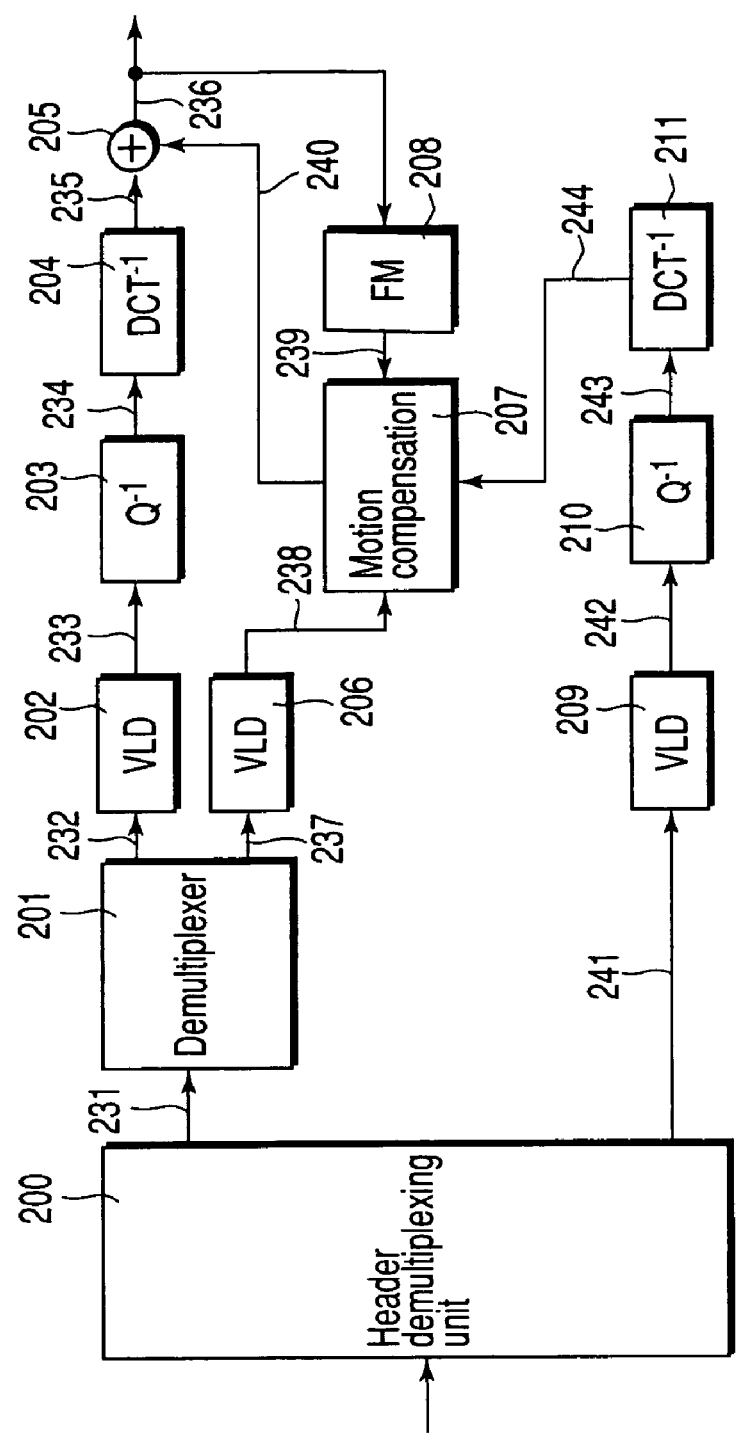
FIG. 15 is a block diagram showing the arrangement of a picture decoding apparatus according to the third embodiment of the present invention.

FIG. 15 shows the arrangement of a picture decoding apparatus according to this embodiment which corresponds to the picture encoding apparatus in FIG. 14. A reference picture code stream 241 after motion compensation, which is demultiplexed from the input code stream by a header demultiplexing unit 200, is a code stream obtained by encoding a reference picture signal after motion compensation, as described with reference to FIG. 14. This code stream is decoded through a variable length encoder 209, dequantizer 210, and inverse discrete cosine transformer 211. As a consequence, a reference picture signal 244 after motion compensation is reconstructed. The reconstructed reference picture signal 244 after motion compensation is input to a motion compensation predictor 207 instead of a frame memory 208 as in the first and second embodiments.

For example, when an error occurs, the motion compensation predictor 207 can output the reference picture signal 244 after motion compensation which is reconstructed in the above manner as a predictive picture signal 240 instead of input motion vector information 238 and a reference picture signal 239 from the frame memory 208.

According to this embodiment, even when a plurality of reference pictures are to be used while some manipulations are applied thereto, the reference picture signal 142 after motion compensation is encoded, which is a predictive picture signal directly subtracted, by a subtracter 102, from an input video signal 132 after area segmentation. The reference signal 142 is used as a signal for restoration upon occurrence of an error. This makes it possible to solve the above problems.

In many cases, a picture frame subjected to predictive encoding is predictively encoded while it is selected whether predictive encoding (INTER mode) is performed on a macroblock (small area) basis or intra-frame encoding (INTRA mode) is performed. In this case, since there is no predictive picture signal in any intra-frame-encoded macroblocks, if a reference picture signal is output as one frame, an unnecessary portion may be produced. It is therefore possible to select and store the reference picture code streams 147 required for decoding operation on a macroblock basis as well as storing reference picture signals in the frame memory on a frame basis.

(Fourth Embodiment)

The first to third embodiments have exemplified the case wherein video encoding is performed by a combination of motion compensation prediction, discrete cosine transform, quantization, and variable length encoding. However, the present invention is not limited to such an encoding scheme. For example, the present invention can be applied to next-generation encoding techniques such as wavelet encoding.

FIG. 16 shows the basic arrangement of a picture encoding apparatus which is generalized in consideration of such various picture encoding schemes. Referring to FIG. 16, a picture encoding unit 1901 encodes an input picture signal (mainly a video signal) 1931 using a reference picture signal to output a picture code stream 1932. The picture encoding unit 1901 may use any kind of encoding scheme as long as it is a scheme using a reference picture signal. A reference picture signal 1933 used by the picture encoding unit 1901 is encoded by a reference picture encoding unit 1902 and output as a reference picture code stream 1934.

FIG. 17 shows the basic arrangement of a picture decoding apparatus corresponding to the picture encoding apparatus in FIG. 16. A reference picture code stream 2032 demultiplexed from an input code stream is decoded by a reference picture decoding unit 2002. As a consequence, a reference picture signal 2033 is reconstructed. A picture code stream 2031 demultiplexed from the input code stream is decoded by a picture decoding unit 2001. In this case, if the reference picture signal 2033 reconstructed by the reference picture decoding unit 2002 exists as a reference picture signal, this signal can be used as necessary.

(Fifth Embodiment)

In general, when a reference picture is encoded in the INTRA mode, an error is produced between this reference picture and the original reference picture due to quantization. For this reason, in encoding operation, the picture encoded signal obtained by conversion/encoding and quantization is used as a reference picture instead of a reference picture signal as a predictive signal. By transmitting this signal as an additional reference picture encoded signal to the decoding apparatus side, a system free from errors due to quantization can be realized.

By using the present invention in combination with a feedback information RTCP implementing RTP (Real-time Transport Protocol) or the like, the effect of the present invention can be enhanced. This is because when error information of a network is sent from the reception side to the transmission side, the information can be used as a condition for determining whether or not to transmit additional information. If, for example, it is determined from RTCP that an error has occurred, the reference picture code stream of the next frame is transmitted to the reception side.

Picture encoding and decoding in the present invention described above may be implemented by hardware, or part or all of processing may be implemented by software using a computer. Such software (computer program) may be distributed upon being recorded on a recording medium such as a semiconductor memory or CD-ROM, or can be distributed through a transmission medium such as a radio channel or wire.

As described above, according to the present invention, the recovery ability upon occurrence of an error can be improved without any deterioration in transmission efficiency. In addition, processing within an encoding framework and preparing all data at the time of encoding will eliminate the necessity to perform re-encoding, complicated processing at the time of transmission, or the like. This makes it possible to construct a simple picture transmission/reception system.

As has been described above, the video encoding and decoding apparatuses according to the present invention can be used for a system designed to compression-encode pictures in a small information amount and transmit or store the resultant data in a videophone, video conference system, portable information terminal, digital video disk system, and digital TV broadcasting system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A picture encoding method comprising:
   receiving an input video signal,
   encoding the video signal using a reference picture signal in a frame memory to generate a video code stream;
   storing in the frame memory as the reference picture a local decoded picture signal generated in encoding the video signal;
   encoding the reference picture signal read out from the frame memory to generate a reference picture code stream, and
   multiplexing the video code stream with the reference picture code stream to generate an output code stream.

2. The method according to claim 1, wherein encoding the video signal encodes the video signal in units of a macroblock, encoding the reference picture signal encodes the reference picture signal in units of a macroblock, and the multiplexing multiplexes the video code stream with the reference picture code stream in units of a macroblock.

3. A picture encoding apparatus comprising:
   a receiving unit configured to receive an input video signal,
   a first encoding unit configured to encode the video signal by using a reference picture signal to generate a video code stream,
   a frame memory configured to store a local decoded picture signal generated in encoding the video signal as the reference picture signal;
   a second encoding unit configured to encode the reference picture signal to generate a reference picture code stream, and
   a multiplexing unit configured to multiplex the video code stream and the reference picture code stream read out from the frame memory to generate an output code stream.

4. The apparatus according to claim 3, wherein the first encoding unit encodes the video signal in units of a macroblock, the second encoding unit encodes the reference picture signal in units of a macroblock, and the multiplexing unit multiplexes the video code stream with the reference picture code stream in units of a macroblock.

5. A computer readable memory medium storing a computer program which when executed by a computer results in performance of steps comprising:
 (a) receiving an input video signal;
 (b) encoding the video signal using a reference picture signal to generate a video code stream;
 (c) encoding the reference picture signal to generate a reference picture code stream;
 (d) storing in a frame memory a local decoded picture signal generated in encoding the video signal;
 (e) encoding the reference picture signal read out from the frame memory; and
 (f) multiplexing the video code stream with the reference picture code stream to generate an output code stream.

6. The medium according to claim 5, wherein:

step (b) comprises encoding the video signal in units of a macroblock, step (e) comprises encoding the reference picture signal in units of a macroblock, and step (f) comprises multiplexing the video code stream with the reference picture code stream in units of a macroblock.

* * * * *